March 4, 1941.    T. J. ATKINS    2,233,572
LIQUID LEVEL GAUGE
Filed Oct. 3, 1938
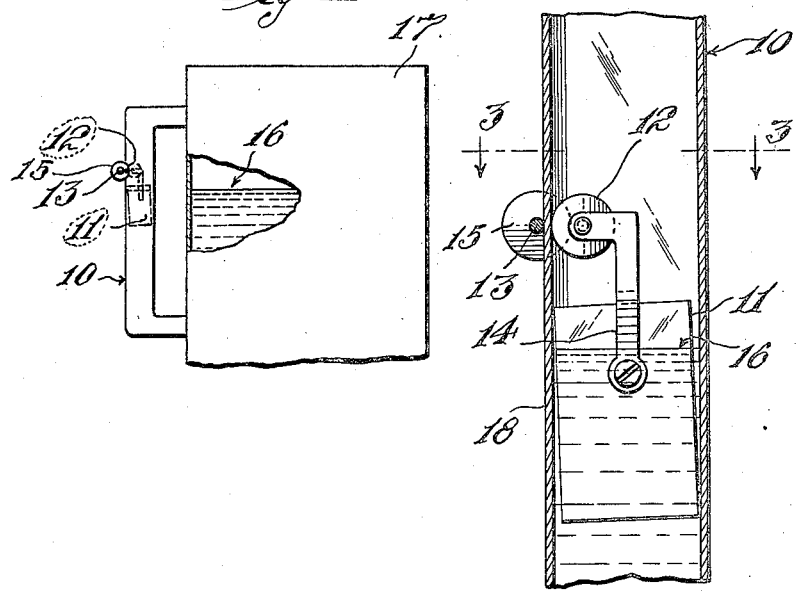
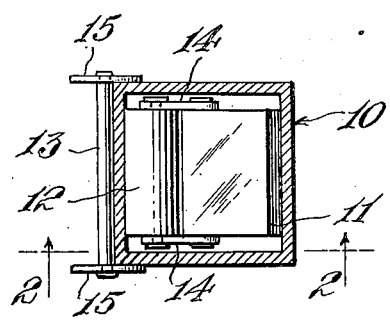
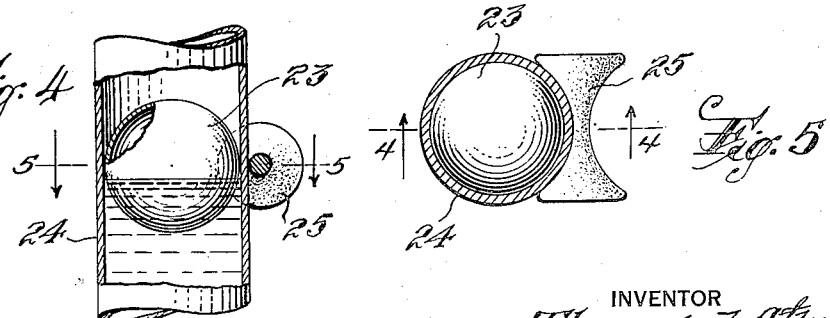
INVENTOR
Thomas J. Atkins
BY
ATTORNEY Patented Mar. 4, 1941

2,233,572

UNITED STATES PATENT OFFICE 2,233,572

LIQUID-LEVEL GAUGE

Thomas J. Atkins, East Orange, N. J.

Application October 3, 1938, Serial No. 233,015

3 Claims. (Cl. 73—305)

My invention relates to improvements in liquid-level gauges.

One of the objects of my invention is the provision of an improved construction for liquid-level gauges adapted particularly for indicating the level of the refrigerant in air-conditioning systems and in electric refrigerators, and which has advantages over those proposed heretofore in the way of greater simplicity of construction and manner of operation, and reliability in operation.

Other objects and advantages will hereinafter appear.

For the purpose of illustrating my invention, an embodiment thereof is shown in the drawing, wherein Figure 1 is a simplified elevational view, partly broken away, of a liquid-level gauge constructed and operating in accordance with my invention;

Figure 2 is an enlarged, sectional, fragmentary view taken from Figure 1, the section being taken on the line 2—2 in Figure 3;

Figure 3 is a section taken on the line 3—3 in Figure 2;

Figure 4 is a sectional view similar to Figure 2, showing another modification, the section being taken on the line 4—4 in Figure 5; and Figure 5 is a section taken on the line 5—5 in Figure 4.

With reference more particularly to Figures 1, 2 and 3, my improved gauge comprises a rectangular tube 10 of non-magnetic material, a float 11 disposed in the tube to follow the liquid level therein, a permanent magnet 12 carried by the float, and an indicating element 13 disposed outside of the tube and held against the same by the magnetic attraction of the magnet.

The magnet 12 is cylindrical and is supported for free rotation by brackets 14 fixed to and extending upwardly from the float.

The indicating element 13 is in the form of a cylindrical bar whose axis is substantially parallel to the axis of the magnet, and discs 15 of magnetic material are journalled on its ends to act as guides and also as part of the magnetic path between the magnet and element 13.

In operation, the float 11 will cause the magnet 12 to follow the liquid level 16 in the tank 17. The magnet operates to hold the indicating element against the tube, by the magnetic attraction, and causes this element to roll along the tube in direction and amount corresponding to occurring movement of the magnet and float in following the liquid level 16. A suitable scale may be put on the face 18 of the tube 10 if desired.

In the embodiment of my invention, shown in Figures 4 and 5, the reference numeral 23 designates a steel-ball float part disposed in the tube 24 to follow the liquid level therein. An indicating part 25 is disposed outside of the tube and is shaped as shown to roll along the tube. The indicating part 25 is a permanent magnet, and the float part 23 is of magnetic material. Due to the magnetic attraction between the parts, the indicating part 25 is held against the tube and is caused to roll along the same with occurring movement of the float part 23 in following the liquid level in the tube.

A satisfactory material for the permanent magnets is disclosed in Patent No. 1,947,274 of February 13, 1934, to William E. Ruder.

The above described arrangements in which a rolling contact is provided between the two surfaces and the associated moving elements give rise to a minimum of friction thereby increasing the accuracy and reliability, and minimizes the possibility of the parts becoming disassociated in operation.

It will be understood that various other embodiments of my invention, other than those shown, are possible without departing from the spirit of my invention or the scope of the claims.

I claim as my invention:

1. In a liquid-level gauge, a tube, a float disposed in said tube to follow the liquid level therein, a permanent magnet carried by said float for rotation and shaped to roll along the inside surface of said tube, and an indicating element disposed outside of said tube and held against the same by the magnetic attraction of said magnet and movable by reason of such attraction along said tube with occurring movement of said magnet and float in following the liquid level in said tube.

2. In a liquid-level gauge, a tube, a float disposed in said tube to follow the liquid level therein, a permanent magnet of cylindrical form carried by said float for rotation to roll along the inside surface of said tube, and an indicating element disposed outside of said tube and being in the form of a cylindrical bar whose axis of rotation is substantially parallel to the axis of said magnet, said magnet operating to hold said element against said tube by the magnetic attraction and to cause said element to roll along said tube in direction and amount corresponding to occurring movement of the magnet and float in following the liquid level in said tube.

3. In a liquid-level gauge, a tube, a float actuated part disposed in said tube and adapted to follow the liquid level, an indicating part disposed outside of said tube for movement along the same, said parts being constructed and arranged to roll along the respective inside and outside surfaces of said tube in following the liquid level, one of said parts being a permanent magnet, the other part being of magnetic material, said indicating part being held adjacent said first named part by the magnetic attraction between said parts and being caused by reason of said attraction to roll along said tube with occurring movement of said first named part in following the liquid level.

THOMAS J. ATKINS.